United States Patent
Hotta et al.

(10) Patent No.: US 7,650,071 B2
(45) Date of Patent: Jan. 19, 2010

(54) OPTICAL SIGNAL RECEIVER, OPTICAL SIGNAL MONITORING UNIT, AND OPTICAL SIGNAL MONITORING METHOD

(75) Inventors: Atsuya Hotta, Tokyo (JP); Makoto Ishiguro, Tokyo (JP)

(73) Assignee: NEC Corporation, Tokyo (JP)

( * ) Notice: Subject to any disclaimer, the term of this patent is extended or adjusted under 35 U.S.C. 154(b) by 502 days.

(21) Appl. No.: 11/377,412

(22) Filed: Mar. 17, 2006

(65) Prior Publication Data

US 2006/0216041 A1 Sep. 28, 2006

(30) Foreign Application Priority Data

Mar. 22, 2005 (JP) .............................. 2005-082613

(51) Int. Cl.
*H04B 10/00* (2006.01)

(52) U.S. Cl. ......................................... 398/25; 398/155

(58) Field of Classification Search .................. 398/25, 398/155

See application file for complete search history.

(56) References Cited

U.S. PATENT DOCUMENTS

| | | | | |
|---|---|---|---|---|
| 4,688,170 A | * | 8/1987 | Waite et al. ................... | 703/27 |
| 5,546,211 A | * | 8/1996 | Devon .......................... | 398/98 |
| 5,991,303 A | * | 11/1999 | Mills ........................... | 370/402 |
| 6,038,400 A | * | 3/2000 | Bell et al. ..................... | 710/11 |
| 6,104,697 A | * | 8/2000 | Kwon .......................... | 370/232 |
| 6,452,425 B1 | * | 9/2002 | Gregorian et al. ............. | 327/99 |
| 7,376,147 B2 | * | 5/2008 | Seto et al. .................... | 370/465 |
| 2002/0141688 A1 | * | 10/2002 | Chavin ......................... | 385/17 |
| 2003/0002108 A1 | * | 1/2003 | Ames et al. .................. | 359/152 |
| 2005/0066045 A1 | * | 3/2005 | Johnson et al. ............... | 709/230 |
| 2006/0153222 A1 | * | 7/2006 | Van Caenegem et al. ..... | 370/445 |
| 2008/0131118 A1 | * | 6/2008 | Chiang ........................ | 398/45 |

FOREIGN PATENT DOCUMENTS

| | | |
|---|---|---|
| JP | 2001-53814 | 2/2001 |
| JP | 2003-509927 | 3/2003 |

OTHER PUBLICATIONS

VSC8123 Product Brief. 10 Mbps to 2.7 Gbps Adaptive, Rate-Agile Clock and Data Recovery. Vitesse Semiconductor Corporation. 2002.*
Advance Product Information VSC7969. 3.125Gb/s Integrated Transimpedance and Limiting Amplifier with Signal Detect. Vitesse Semiconductor Corporation. Feb. 9, 2001.*

* cited by examiner

*Primary Examiner*—Leslie Pascal
(74) *Attorney, Agent, or Firm*—McGinn IP Law Group, PLLC

(57) ABSTRACT

An optical signal receiver is provided which is capable of making an optical signal receiver come into common and shared use even when a plurality of transmission methods is to be performed and of constructing a simplified optical transmission system. In a performance monitoring circuit, a switching control section transmits a connecting control signal to make a switching section operate so that the switching section selects a monitoring section to be connected based on bit-rate information corresponding to information about a transmission method type fed from a frequency detecting circuit and the selected monitoring section is connected to a clock/data regenerating circuit. The monitoring section extracts alarm information from a data signal fed from the clock/data regenerating circuit and transfers the alarm information to the selection connecting section. When the switching control section receives alarm information, the alarm information is transferred to devices mounted on a downstream side.

20 Claims, 6 Drawing Sheets

*1;Optical Signal Receiver*

FIG.4

*12a: Associated Table*

| Type Number | Transmission Method Type | Bit Rate [Mbps] | Monitoring Section ID on other end of connection |
|---|---|---|---|
| 1 | OC-3, STM-1 | 155.52 | 0001 |
| 2 | OC-12, STM-4 | 622.08 | 0002 |
| 3 | FC | 1062.50 | 0003 |
| 4 | GbE | 1250.00 | 0004 |
| 5 | 2GFC | 2125.00 | 0005 |
| 6 | OC-48, STM-16 | 2488.32 | 0006 |
| ... | ... | ... | ... |

OPTICAL SIGNAL RECEIVER, OPTICAL SIGNAL MONITORING UNIT, AND OPTICAL SIGNAL MONITORING METHOD

BACKGROUND OF THE INVENTION

1. Field of the Invention

The present invention relates to an optical signal receiver, an optical signal monitoring unit, and an optical signal monitoring method, and more particularly to the optical signal receiver having a function of monitoring optical signals according to a bit rate of an input signal, to the optical signal monitoring unit making up the optical signal receiver, and the optical signal monitoring method without depending on bit rate information.

The present application claims priority of Japanese Patent Application No. 2005-082613 filed on Mar. 22, 2005, which is hereby incorporated by reference.

2. Description of the Related Art

Conventionally, in an optical transmission system, various transmission path networks having different specifications are employed and bit rates to be used for transmission are various. For example, a plurality of types of transmission networks is employed for transmission, which includes a SONET (Synchronous Optical Network)/SDH (Synchronous Digital Hierarchy) network, FC (Fiber Channel) network, GbE (Gigabit Ethernet) network, or a like. Therefore, in an optical signal transmitter and an optical signal receiver serving as signal transmission devices connected through a transmission path using an optical fiber, for example, it is made necessary to use a device designed specifically for every bit rate.

As shown in FIG. 6, for example, in the SONET/SDH network, an optical signal transmitter 102 for the SONET/SDH network and an optical signal receiver 103 for the SONET/SDH network are connected to each other through a transmission optical fiber 101. In the GbE network, an optical signal transmitter 105 for the GbE network and an optical signal receiver 106 for the GbE network are connected to each other through a transmission optical fiber 104. In the FC network, an optical signal transmitter 108 for the FC network and an optical signal receiver 109 are connected to each other through a transmission optical fiber 107.

Each of the optical signal receivers 103, 106, and 109 has a function of monitoring optical communications, which includes a photoelectric converting circuit 202 to convert an input optical signal into an electrical signal, a clock/data regenerating circuit 203 to extract a clock signal, based on the input electrical signal, to identify a data signal and to regenerate the data signal, and a performance monitoring circuit 204 to receive the clock signal and data signal from the clock/data regenerating circuit 203 and to monitor alarm information. In each performance monitoring circuit 204 included in each of the optical signal receivers, an operation of detecting the alarm information differs depending on, for example, every specification corresponding to a bit rate and, therefore, the optical signal receivers cannot be used in a shared manner.

For example, in the SONET/SDH network, in order to achieve effective signal transmission, an overhead used to transfer operation and maintenance information (error monitoring signal, alarm transferring signal, synchronization signal) is predetermined and, by using the overhead, a parity check called a "Bit Interleaved Parity" is made among repeaters or among multiplexing terminal stations to identify a failure section.

In response to demands of a recent multi-media service providing market and in order to perform such the diversified transmission methods as described above, a conventional optical signal receiver being able to receive signals irrespective of types of adopted protocols (bit rates) is disclosed in Patent Reference 1 (Japanese Patent Application Laid-open No. 2001-053814) and Patent Reference 2 (Japanese Patent Application Laid-open No. 2003-509927). In these conventional optical signal receivers, when alarm information contained in a transmitted signal is to be extracted from a data signal regenerated by a clock/data regenerating circuit, optical signal receivers each having a different performance monitoring circuit that can correspond to a different bit rate must be prepared, thus making configurations expensive and complicated.

SUMMARY OF THE INVENTION

In view of the above, it is an object of the present invention to provide an optical signal receiver which is capable of making an optical signal receiver come into common and shared use even when a plurality of transmission methods is to be performed and of constructing a simplified optical transmission system, an optical signal monitoring unit making up the optical signal receiver and an optical signal monitoring method.

According to a first aspect of the present invention, there is provided an optical signal receiver including:

a photoelectric converting unit to receive an optical signal containing alarm information and to convert the received optical signal into an electrical signal;

a regenerating unit to regenerate a clock signal and data based on the electrical signal obtained by the photoelectric conversion in the photoelectric converting unit and to obtain a regenerated signal including the regenerated clock signal and the regenerated data;

a transmission speed information acquiring unit to acquire information about a transmission speed of the regenerated signal;

a plurality of alarm information extracting units provided in a manner to correspond to each of a plurality of types of transmission methods each providing, at least, a different transmission speed for every different type of transmission method, which extracts alarm information contained in the regenerated signal; and a selection connecting unit to select a corresponding alarm information extracting unit out of the plurality of alarm information extracting units based on the transmission speed information and to connect the selected alarm information extracting unit to the regenerating unit.

In the foregoing first aspect, a preferable mode is one wherein the selection connecting unit has a storing unit to store the transmission speed information associated with the alarm information extracting unit on an other end of connection.

Also, a preferable mode is one wherein the transmission speed information acquiring unit has a frequency detecting unit to detect a frequency of the regenerated signal.

Also, a preferable mode is one wherein the regenerating unit transmits information about a frequency of a clock signal to the transmission speed information acquiring unit and the transmission speed information acquiring unit has a transmission speed information converting unit to convert the information about the frequency of the clock signal into the transmission speed information.

Also, a preferable mode is one wherein the selection connecting unit outputs a warning representing non-monitoring when the alarm information extracting unit on an other end of connection which corresponds to the transmission speed information of the regenerated signal is not provided.

Furthermore, a preferable mode is one wherein the selection connecting unit receives the alarm information extracted by the alarm information extracting unit and sends out the received information towards a downstream side.

According to a second aspect of the present invention, there is provided an optical signal monitoring unit used in an optical signal receiver including a photoelectric converting unit to receive an optical signal containing alarm information and to convert the received optical signal into an electrical signal, a regenerating unit to regenerate a clock signal and data based on the electrical signal obtained by the photoelectric conversion in the photoelectric converting unit and to obtain a regenerated signal including the regenerated clock signal and the regenerated data, the optical signal monitoring unit including:

a plurality of alarm information extracting units provided in a manner to correspond to each of a plurality of types of transmission methods each providing, at least, a different transmission speed for every different type of transmission method, which extracts alarm information contained in the regenerated signal; and a selection connecting unit to select a corresponding alarm information extracting unit out of the plurality of alarm information extracting units based on transmission speed information fed from a transmission speed information acquiring unit that obtains the transmission speed information about the regenerated signal and to connect the selected alarm information extracting unit to the regenerating unit.

In the foregoing second aspect, a preferable mode is one wherein the selection connecting unit has a storing unit to store the transmission speed information associated with the alarm information extracting unit on an other end of connection.

Also, a preferable mode is one wherein the transmission speed information acquiring unit has a frequency detecting unit to detect a frequency of the regenerated signal.

Also, a preferable mode is one wherein the regenerating unit transmits information about a frequency of a clock signal to the transmission speed information acquiring unit and the transmission speed information acquiring unit has a transmission speed information converting unit to convert the information about the frequency of the clock signal into the transmission speed information.

Also, a preferable mode is one wherein the selection connecting unit outputs a warning representing non-monitoring when the alarm information extracting unit on an other end of connection which corresponds to the transmission speed information of the regenerated signal is not provided.

Furthermore, a preferable mode is one wherein the selection connecting unit receives the alarm information extracted by the alarm information extracting unit and sends out the received information towards a downstream side.

According to a third aspect of the present invention, there is provided a method for monitoring an optical signal including:

making a photoelectric converting unit receive an optical signal containing alarm information and convert the received optical signal into an electrical signal;

making a regenerating unit regenerate a clock signal and data based on the electrical signal obtained by the photoelectric conversion in the photoelectric converting unit and obtain a regenerated signal including the regenerated clock signal and the regenerated data;

making a transmission speed information acquiring unit obtain information about a transmission speed of the regenerated signal;

making a specified alarm information extracting unit extract alarm information contained in the regenerated signal, wherein the specified alarm information extracting unit is selected out of a plurality of alarm information extracting units provided in a manner to correspond to each of a plurality of types of transmission methods each providing, at least, a different transmission speed for every different type of transmission method; and making a selection connecting unit select a corresponding alarm information extracting unit out of the plurality of alarm information extracting units based on the transmission speed information, and connect the selected alarm information extracting unit to the regenerating unit.

In the foregoing third aspect, a preferable mode is one wherein the selection connecting unit has a storing unit to store the transmission speed information associated with the alarm information extracting unit on an other end of connection.

Also, a preferable mode is one wherein the transmission speed information acquiring unit detects a frequency of the regenerated signal by using a frequency detecting unit. Also, a preferable mode is one wherein the regenerating unit transmits the information about a clock signal to the transmission speed information acquiring unit and the transmission speed information acquiring unit converts the information about a frequency into the transmission speed information by using a transmission speed information converting unit.

Also, a preferable mode is one wherein the selection connecting unit outputs a warning representing non-monitoring when the alarm information extracting unit on an other end of connection which corresponds to the transmission speed information of the regenerated signal is not provided.

Furthermore, a preferable mode is one wherein selection connecting unit receives the alarm information extracted by the alarm information extracting unit and sends out the received information towards a downstream side.

According to a fourth aspect of the present invention, there is provided an optical signal receiver including:

a photoelectric converting unit to receive an optical signal containing alarm information and to convert the received optical signal into an electrical signal;

a regenerating unit to regenerate a clock signal and data based on the electrical signal obtained by the photoelectric conversion in the photoelectric converting unit and to obtain a regenerated signal including the regenerated clock signal and the regenerated data;

a transmission speed information acquiring unit to acquire information about a transmission speed of the regenerated signal;

a plurality of alarm information extracting units provided in a manner to correspond to each of a plurality of types of transmission methods each providing, at least, a different transmission speed for every different type of transmission method, which extracts alarm information contained in the regenerated signal; and a selection connecting unit to select a corresponding alarm information extracting unit out of the plurality of alarm information extracting units based on the transmission speed information and to connect the selected alarm information extracting unit to the regenerating unit, wherein the selection connecting unit has a storing unit to store the transmission speed information associated with the alarm information extracting unit on an other end of connection, wherein the transmission speed information acquiring unit has a frequency detecting unit to detect a frequency of the regenerated signal, wherein the regenerating unit transmits information about a frequency of a clock signal to the transmission speed information acquiring unit and the transmission speed information acquiring unit has a transmission speed information converting unit to convert the information about the frequency of the clock signal into the transmission speed information, and wherein the selection connecting unit receives the alarm information extracted by the alarm information extracting unit and sends out the received information towards a downstream side, whereas the selection connecting unit outputs a warning representing non-monitoring when the alarm information extracting unit on an other end of connection which corresponds to the transmission speed information of the regenerated signal is not provided.

With the above configurations, the selection connecting means selects a corresponding alarm information extracting means out of a plurality of alarm information extracting means based on transmission speed information obtained from a transmission speed information obtaining means and connects the selected alarm information extracting means to a regenerating means and the alarm information extracting means extracts alarm information contained in a regenerating signal according to the transmission speed information and, therefore, the optical signal receiver is made to come into the common and shared use even when the plurality of transmission methods has to be performed and the simplified optical transmission system can be constructed, thus reducing costs and complexity of configuration.

BRIEF DESCRIPTION OF THE DRAWINGS

The above and other objects, advantages, and features of the present invention will be more apparent from the following description taken in conjunction with the accompanying drawings in which:

FIG. 4 is a diagram showing an associated table stored in a storing section of the selection connecting section according to the first embodiment of the present invention;

DETAILED DESCRIPTION OF THE PREFERRED EMBODIMENTS

Best modes of carrying out the present invention will be described in further detail using various embodiments with reference to the accompanying drawings. The purpose of the present invention is achieved in a manner in which a selection connecting means selects a corresponding alarm information extracting means out of a plurality of alarm information extracting means based on transmission speed information obtained from a transmission speed information obtaining means and connects the selected alarm information extracting means to a regenerating means and the alarm information extracting means extracts alarm information contained in a regenerating signal according to the transmission speed information which allows the optical signal receiver to come into common and shared use even when a plurality of transmission methods has to be performed, thus enabling the simplified optical transmission system to be constructed, thus reducing cost and complexity of configuration.

First Embodiment

Figure 1:
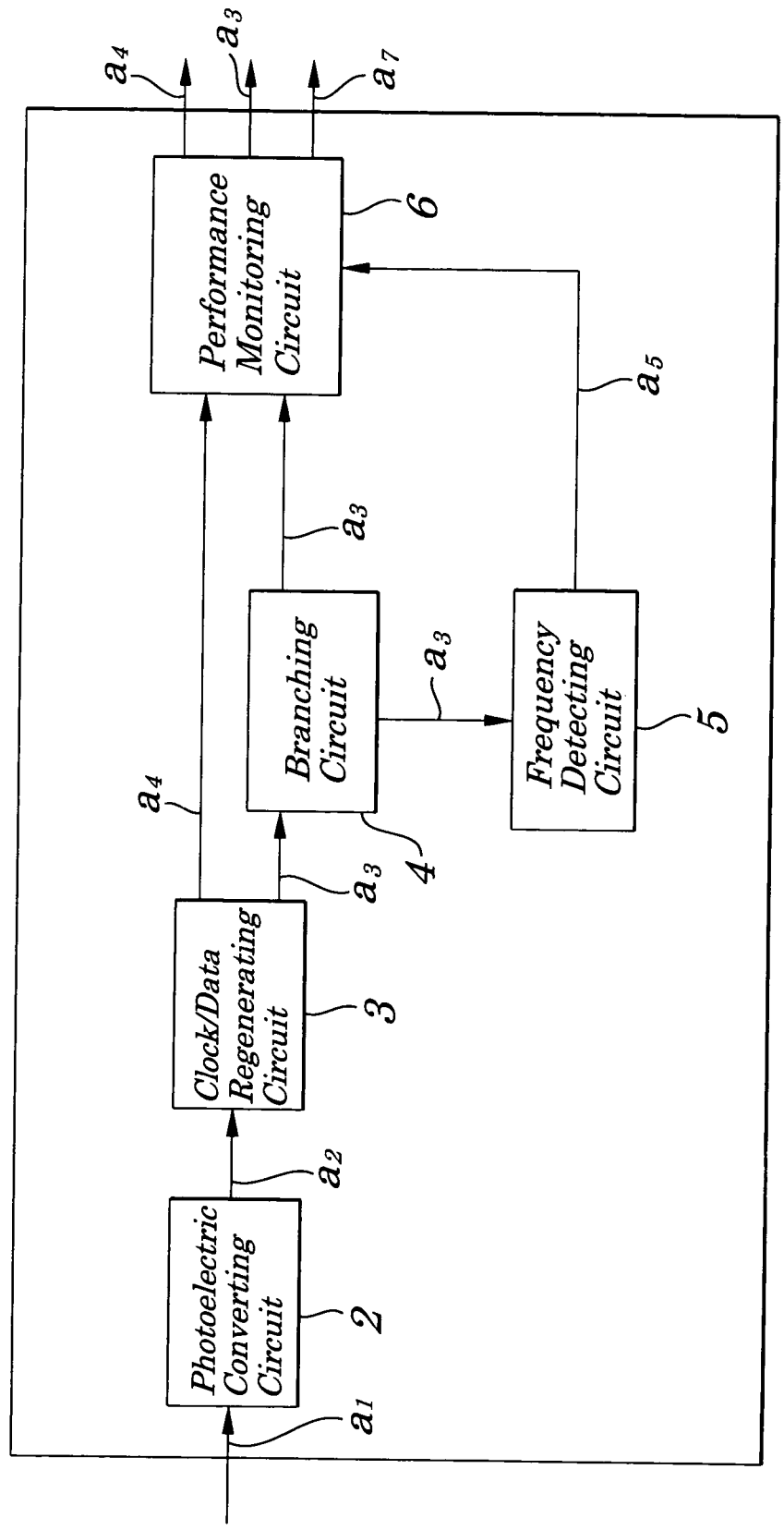
FIG. 1 is a block diagram showing configurations of an optical signal receiver according to a first embodiment of the present invention.
Figure 2:
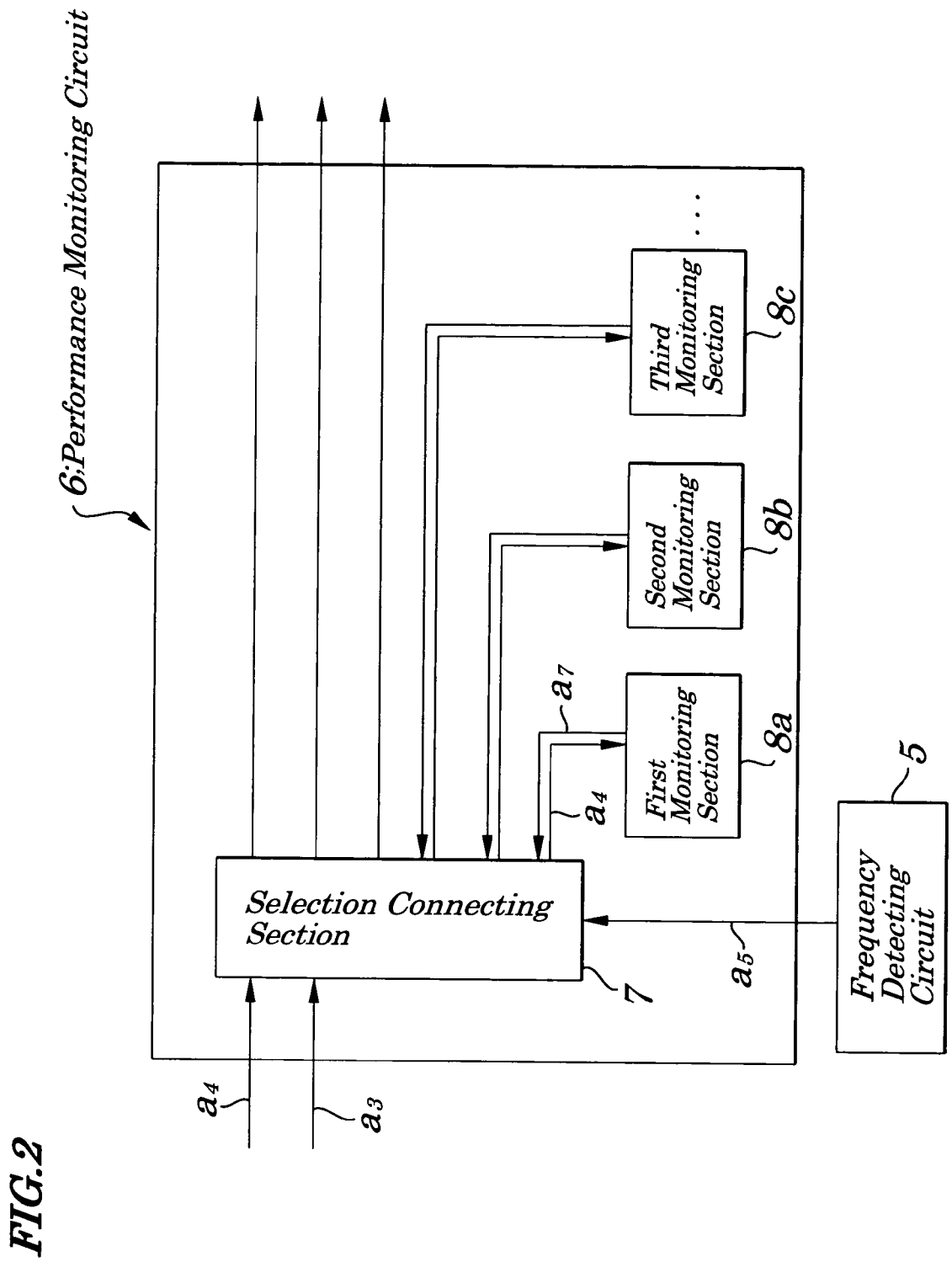
FIG. 2 is a block diagram showing configurations of a performance monitoring circuit of the optical signal receiver of FIG. 1.
Figure 3:
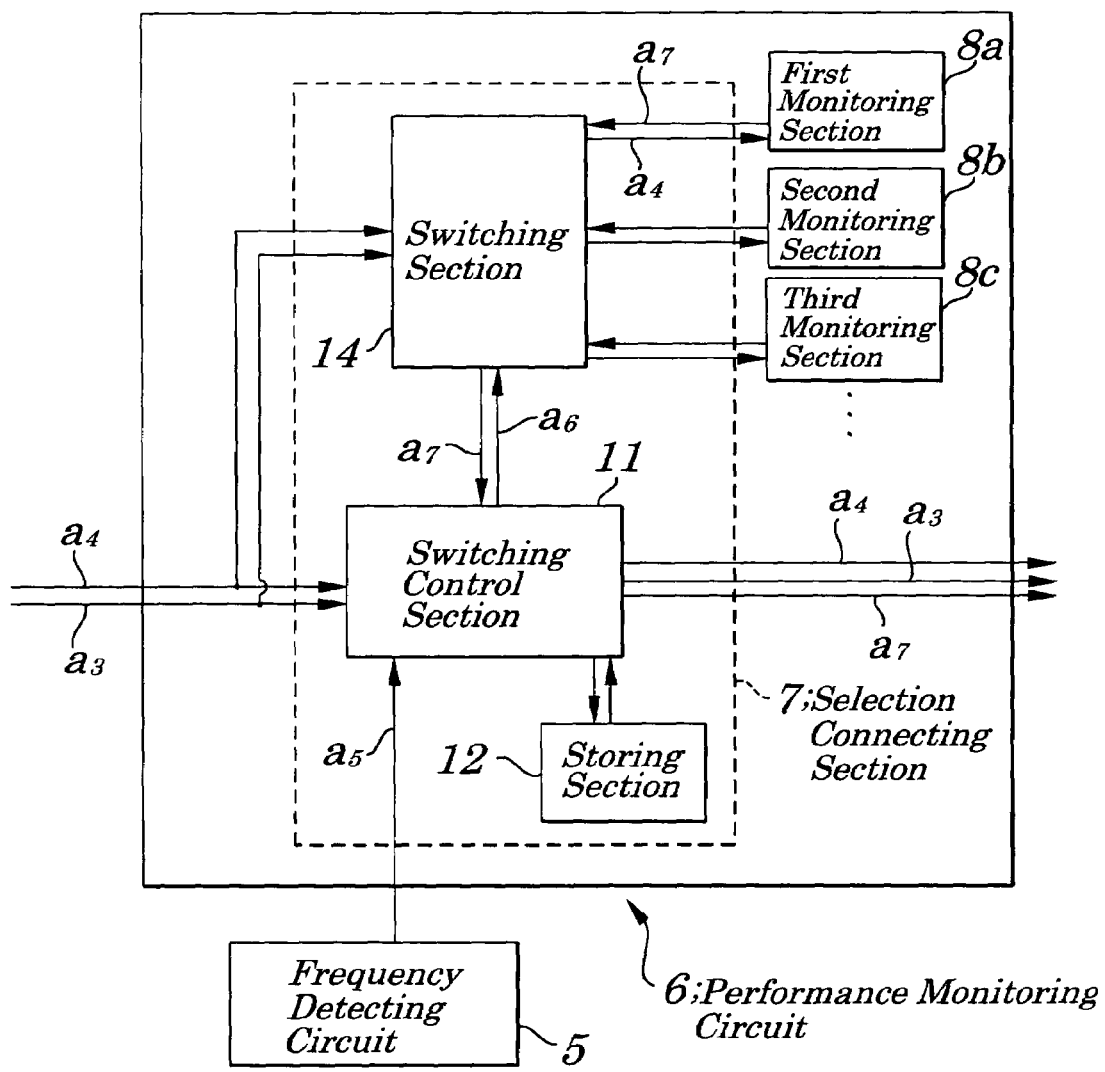
FIG. 3 is a block diagram showing configurations of a selection connecting section of the performance monitoring circuit of FIG. 2.

FIG. 1 is a block diagram showing configurations of an optical signal receiver according to the first embodiment of the present invention, FIG. 2 is a block diagram showing configurations of a performance monitoring circuit of the optical signal receiver of FIG. 1. FIG. 3 is a block diagram configurations of a selection connecting section of the performance monitoring circuit of FIG. 2. FIG. 4 is a diagram showing an associated table stored in a storing section of the selection connecting section of the first embodiment.

An optical signal receiver 1 according to the first embodiment has an optical communication monitoring function, which includes, as shown in FIG. 1, a photoelectric converting circuit 2 to convert an input optical signal into an electrical signal, a clock/data regenerating circuit 3 to regenerate a clock signal and data signal according to the input electrical signal, a branching circuit 4 to transmit a clock signal to a frequency detecting circuit 5 and the performance monitoring circuit 6, the frequency detecting circuit 5 to detect a frequency by counting, for example, the number of pulses to identify a bit rate according to a clock signal and transfers bit rate information to the performance monitoring circuit 6, and the performance monitoring circuit 6 to extract alarm information from a data signal regenerated by the clock regenerating circuit 3 based on the bit rate information received from the frequency detecting circuit 5 and to make quality control of a transmission path and/or a signal to be sent. Moreover, the optical signal receiver 1 is paired with an optical signal transmitter to make up a modularized optical signal transmitting/receiving device (transmission device). A plurality of optical signal transmitting/receiving devices makes up an optical transmission system by being connected through transmission paths using optical fibers.

The performance monitoring circuit 6, as shown in FIG. 2, includes the selection connecting section 7 to select (that is, to select a specified performance monitoring function) a specified section to be connected according to bit rate information, a plurality of monitoring sections (first monitoring section 8a, second monitoring section 8b, . . . ) serving as sections to be connected that extracts alarm information from data signal being transmitted at each of specified bit rates. The performance monitoring circuit 6 sends out the extracted alarm information as alarm information that matches a specification corresponding to the specified bit rate towards a downstream side.

The selection connecting section 7, as shown in FIG. 3, a switching control section 11 to control each component, a storing section 12, and a switching section 14 to connect or disconnect between the clock/data regenerating circuit 3 and each of the first monitoring section 8a, second monitoring section 8b, . . . , according to control by the switching control section 11. The switching control section 11 runs various processing programs stored in the storing section 12, controls each component by using various registers and flags provided in the storing section 12 and performs selection switching control processing or a like. Moreover, the switching control section 11 identifies the monitoring sections (first monitoring section 8a, second monitoring section 8b, . . . ) by using IDs (Identifications) [(0001), (0002), . . . ] of each of the monitoring sections (see FIG. 4).

The storing section 12 is made up of a semiconductor memory such as a ROM (Read Only Memory), RAM (Random Access Memory), or a like and has a program storing area in which various programs such as the selection switching control processing program to be run by the switching control section 11 or a like are stored and an information storing area in which various pieces of information such as the associated table information and/or setting information are stored.

In the selection switching control processing program, procedures are written for transmitting a connection controlling signal to make the switching section 14 operate so that, according to bit rate information corresponding to information about a transmission method type fed from the frequency detecting circuit 5, monitoring sections (first monitoring section 8a, second monitoring section 8b, 8b, . . . ) are selected which serve as sections to be connected that correspond to the bit rate and the selected monitoring sections are connected to the clock/data regenerating circuit 3 (see FIG. 4).

As shown in FIG. 4, in the associated table 12a, the transmission method type, bit rate, monitoring section ID of sections to be connected are stored in a manner in which monitoring sections (first monitoring section 8a, second monitoring section 8b, 8b, . . . ) being sections to be connected are associated with bit rate information for every transmission method type. In the embodiment, each of the first monitoring section 8a, second monitoring section 8b, third monitoring section 8c, fourth monitoring section 8d, fifth monitoring section 8e, sixth monitoring section 8f, . . . is associated with each of signals having a type number 1 [transmission method type: OC (Optical Carrier)—3, STM (Synchronous Transport Module)—1], type number 2 (transmission method type: OC-12, STM-4), type number 3 [transmission method type: FC (Fiber channel)], type number 4 (transmission method type: GbE (Gigabit Ethernet), type number 5 [transmission method type: 2GFC (2 Gbps Fiber Channel)], type number 6 (transmission method type: OC-48, STM-16), . . . so that alarm information extracting processing is performed.

Here, each of the type number 1 (transmission method type: OC-3, STM-1), type number 2 (transmission method type: OC-12, STM-4), type number 6 (transmission method type: OC-48, STM-16) represents a transmission method adopted in the SONET/SDH network. The SONET/SDH is a high-speed optical transmission method adopted in a basic network using optical fiber cables as its transmission cable (transmission medium) in which time division multiplexing transmission is achieved by combining frames reached from a plurality of comparatively low-speed transmission lines and by building the frames as one frame for transmission.

The "STM" denotes a "Synchronous Transport Module" in which information is transmitted in a form of a frame structure in which a channel is defined in a periodical time position and the channel appears irrespective of the presence or absence of information to be transmitted. The "STM-n" ("n" is a 0 or a natural number) represents a multiplexed form (transmission unit) and the n-th digital hierarchy (transmission speed hierarchy) in multiplexing. Moreover, the "STM-n" is a notation adopted in the SDH network specifications and is equivalent to OC-m (however, if n=0, m=1) in the SONET network specifications.

The type number 3 (transmission method type: FC) and the type number 5 (transmission method type: 2GFC) represent a transmission method adopted in the FC network. In the FC network, a transmission method adhering to an FCS (Fibre Channel Standard) developed by A.N.S.I. (American National Standard Institute) is employed, which is used, for example, in cluster connection among computers and/or connection of a computer to a storage device such as a disc array or a like. Also, the type number 4 (transmission method type: GbE) represents a transmission method adopted in the GbE network. In the GbE network, by applying an optical fiber as a transmission cable to the Ethernet being one of LAN specifications, a high-speed transmission method is used. The GbE transmission method adopts same specifications as in the FC network for a physical layer.

Moreover, the bit rate of transmission for the type number 1 (transmission method type: OC-3, STM-1) is 155.52 [Mbps], for the type number 2 (transmission method type: OC-12, STM-4) is 622.08 [Mbps], for the type number 3 (transmission method type: FC) is 1062.50 [Mbps], for the type number 4 (transmission method type: GbE) is 1250.00 [Mbps], for the type number 5 (transmission method type: 2GFC) is 2125.00 [Mbps], and for the type number 6 (transmission method type: OC-48, STM-16) is 2488.32 [Mbps].

Next, by referring to FIG. 1 to FIG. 3, operations of the optical signal receiver 1 of the first embodiment are described. As shown in FIG. 1, when an optical signal "a1" transmitted through an optical fiber serving as an optical transmission path is input to the optical signal receiver 1, the photoelectric converting circuit 2 converts the input optical signal into an electrical signal "a2" and the clock/data regenerating circuit 3 regenerates a clock signal "a3" and a data signal "a4" according to the input electrical signal and outputs these signals. The clock signal "a3" output from the clock/data regenerating circuit 3 is transmitted to the branching circuit 4, whereas the data signal "a4" is transmitted to the performance monitoring circuit 6. The branching circuit 4 transfers the clock signal "a3" to both the frequency detecting circuit 5 and the performance monitoring circuit 6. The frequency detecting circuit 5 detects a frequency by counting, for example, the number of pulses based on the clock signal "a3" to identify a bit rate and transfers the bit rate information "a5" to the performance monitoring circuit 6.

As shown in FIGS. 2 and 3, in the performance monitoring circuit 6, the switching control section 11 of the selection connecting section 7 transmits a connecting control signal "a6" to make the switching section 14 operate so that the switching section 14 selects, for example, the first monitoring section 8a (the second monitoring section 8b, third monitoring section 8c, . . . ) according to bit rate information "a5" corresponding to the transmission method type information fed from the frequency detecting circuit 5, as a section to be connected which corresponds to the bit rate information "a5" and the selected first monitoring section 8a (the second monitoring section 8b, third monitoring section 8c, . . . ) is connected to the clock/data regenerating circuit 3.

Thus, the first monitoring section 8a (the second monitoring section 8b, third monitoring section 8c, . . . ) is connected to the clock/data regenerating circuit 3 and the first monitoring section 8a (the second monitoring section 8b, third monitoring section 8c, . . . ) performs monitoring (performance monitoring) for quality control of a transmission path and/or a signal to be transmitted in a manner to adhere to a bit rate of the input signal. The first monitoring section 8a (the second monitoring section 8b, third monitoring section 8c, . . . ) extracts alarm information "a7" from the data signal "a4" fed from the clock/data regenerating circuit 3 and transfers it to the selection connecting section 7. The selection connecting section 7, when the switching control section 11 receives alarm information "a7", transfers the alarm information "a7" to devices mounted on the downstream side.

When the input optical signal "a1" is transferred according to the SONET/SDH network specifications (for example, type number 1 (transmission method type: OC-3, STM-1), the frequency detecting circuit 5 transfers information indicating that the bit rate is 155. 52 [Mbps], as a corresponding bit rate information "a5", to the performance monitoring circuit 6. In the performance monitoring circuit 6, the switching control section 11 of the selection connecting section 7 transmits a connecting control signal "a6" to make the switching section 14 operate so that the switching section 14 selects, for example, the first monitoring section 8a (ID of monitoring section of a section to be connected: "0001") according to bit rate information "a5" corresponding to the transmission method type information fed from the frequency detecting circuit 5, as a section to be connected which corresponds to the bit rate information "a5", and the selected first monitoring section 8a (the second monitoring section 8b, third monitoring section 8c, . . . ) is connected to the clock/data regenerating circuit 3.

Thus, for example, the first monitoring section 8a is connected to the clock/data regenerating circuit 3 and the first monitoring section 8a performs monitoring in a manner to adhere to a bit rate of the input signal. The first monitoring section 8a extracts alarm information "a7" from the data signal "a4" fed from the clock/data regenerating circuit 3 and transfers it to the selection connecting section 7. A frame to be used in the SONET/SDH network has two-types of overhead areas, one being a section management information (SOH: Section Overhead) and a path management information (POH: Path Overhead). The SOH is used in a relay transmitting section and is transferred as information for maintenance and operations for operational state display, alarm information display, error monitoring, or a like. The POH is used in a multiplexed device and is transferred as information for display of operational states or alarm information, receipt of maintenance signal, and multiplexed structure.

The first monitoring section 8a extracts alarm information "a7" contained in the above overhead area of the data signal "a4". The selection connecting section 7, when the switching control section 11 receives the alarm information "a7", transfers the alarm information "a7" to devices mounted on the downstream side. Thus, from the performance monitoring circuit 6 are output the clock signal "a3", data signal a4, and alarm information "a7".

As described above, according to the embodiment, the single optical signal receiver 1 has the frequency detecting circuit 5 to identify a bit rate and a performance monitoring circuit 6 made up of a plurality of monitoring sections including the first monitoring section 8a, second monitoring section 8b, . . . each corresponding to each bit rate in which a monitoring section corresponding to each bit rate is selected out of these monitoring sections 8a, 8b, . . . . Therefore, it is not necessary to prepare a plurality of types of optical signal receivers each corresponding to each bit rate. This enables an optical transmission system to be constructed by using a common and shared optical signal receiver without depending on bit rate information (and corresponding specification). That is, the optical signal receiver can be made to come into shared or common use even when the plurality of transmission methods has been performed and a simplified optical transmission system can be constructed.

Moreover, in particular, in the optical transmission system in which the plurality of types of transmission methods is employed in a mixed manner, for example, when the plurality of optical signal receivers is mounted at time of first introduction, the same types of the optical signal receivers are simply mounted, which saves time, effort and cost. Also, part of the optical transmission system is replaced with another system using different transmission methods, time, effort and cost can be saved as well. Maintenance and operations can be performed in an easy manner. Furthermore, by connecting the optical signal receiver, bit rate information, that is, a transmission method can be determined at an arbitrary relaying point (or in an arbitrary terminating section).

Second Embodiment

Figure 5:
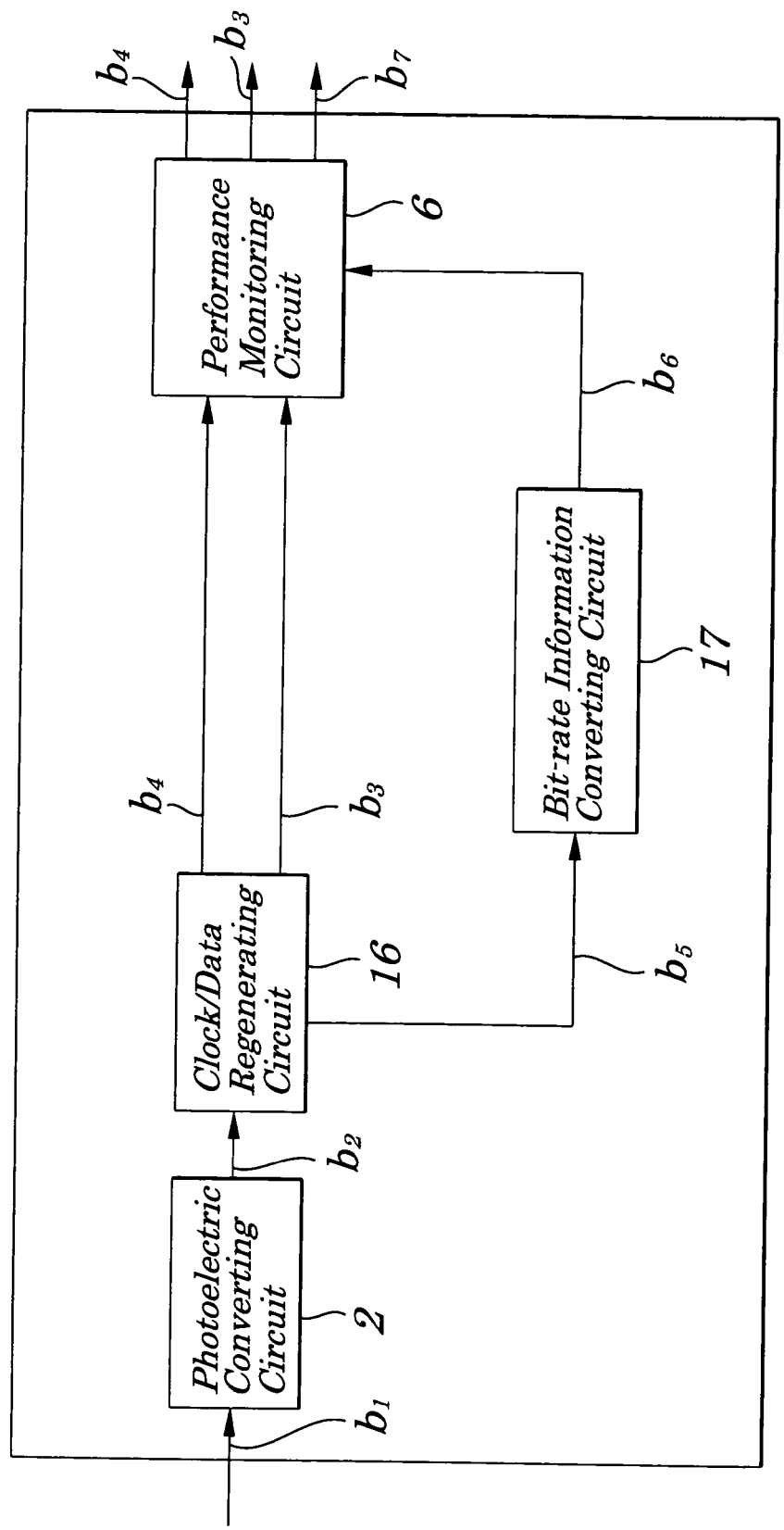
FIG. 5 is a block diagram showing configurations of an optical signal receiver according to a second embodiment of the present invention.
Figure 6:
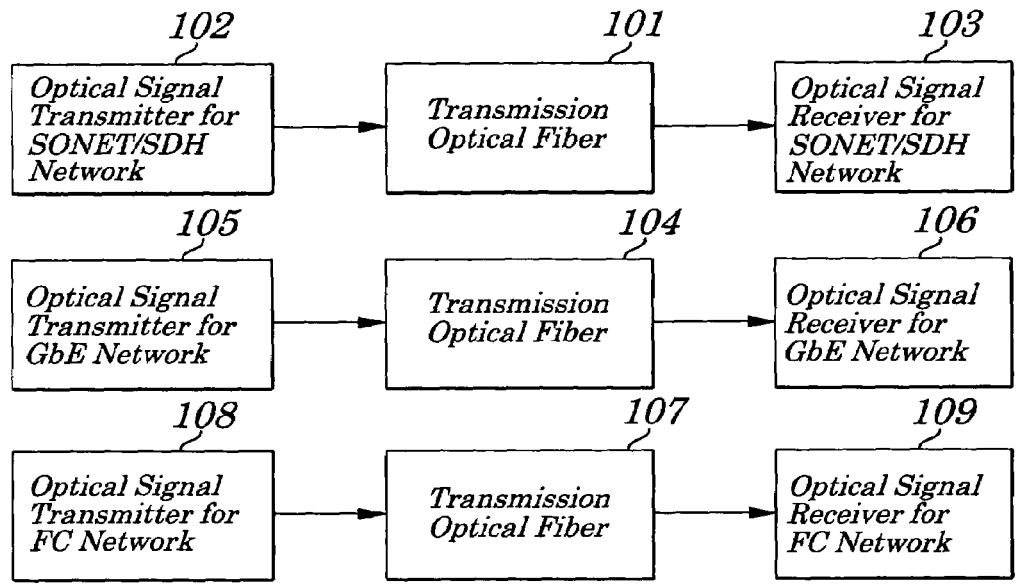
FIG. 6 is a block diagram explaining a conventional technology.
Figure 7:
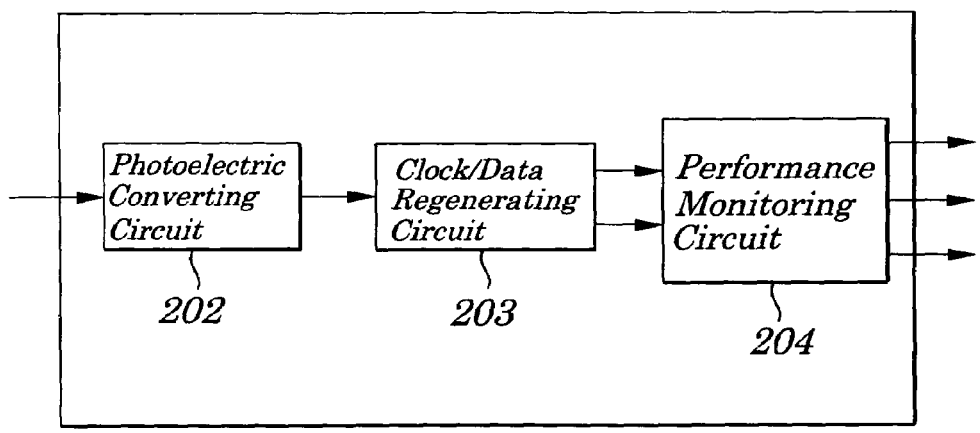
FIG. 7 is another block diagram for further explaining the conventional technology.

FIG. 5 is a block diagram showing configurations of an optical signal receiver 1A according to the second embodiment of the present invention. The optical signal receiver 1A of the second embodiment differs greatly from that in the first embodiment in that frequency information of a clock signal is output from a clock/data regenerating circuit 16 and, instead of the frequency detecting circuit 5 (FIG. 1), a bit rate information converting circuit 17 to convert frequency information into bit rate information is provided. Configurations other the than above are approximately the same as those in the first embodiment and their descriptions are omitted accordingly.

The optical signal receiver 1A of the second embodiment has a function of monitoring optical communications, which includes, as shown in FIG. 5, a photoelectric converting circuit 2 to convert an input optical signal into an electrical signal, a clock/data regenerating circuit 16 to regenerate a clock signal and data signal based on the input electrical signal and to output information about a frequency of the regenerated clock signal, a bit-rate information converting circuit 17 to convert frequency information into bit-rate information, and a performance monitoring circuit 6 to extract alarm information from a data signal regenerated by the clock/data regenerating circuit 16 based on bit-rate information received from the bit-rate information converting circuit 17 to exercise quality control of a transmission path and/or a signal to be transferred.

Next, by referring to FIG. 5, operations of the optical signal receiver 1A of the second embodiment are described. As shown in FIG. 5, when an optical signal "b1" transmitted through an optical fiber serving as an optical transmission path is input to the optical signal receiver 1A, the photoelectric converting circuit 2 converts the input optical signal into an electrical signal "b2" and the clock/data regenerating circuit 16 regenerates a clock signal "b3" and a data signal "b4" according to the input electrical signal and outputs them. The clock/data regenerating circuit 16 further outputs frequency information "b5" of the clock signal "b3". The clock signal "b3" and data signal "b4" output from the clock/data regenerating circuit 16 are transferred to the performance monitoring circuit 6 and the frequency information "b5" is transferred to the bit-rate information converting circuit 17. The bit-rate information converting circuit 17 identifies a bit rate based on the frequency information "b5" received from the clock/data regenerating circuit 16 and transfers the bit-rate information "b6" to the performance monitoring circuit 6.

In the performance monitoring circuit 6, the switching control section 11 of the selection connecting section 7 transmits a connecting control signal "a6" to make the switching section 14 operate so that the switching section 14 selects, for example, the first monitoring section 8a (the second monitoring section 8b, third monitoring section 8c, . . . ) according to bit rate information "b6" corresponding to the transmission method type information fed from the frequency detecting circuit 5, as a section to be connected which corresponds to the bit rate information "b6", and the selected first monitoring section 8a (the second monitoring section 8b, third monitoring section 8c, . . . ) is connected to the clock/data regenerating circuit 16.

Thus, the first monitoring section 8a (the second monitoring section 8b, third monitoring section 8c, . . . ) is connected to the clock/data regenerating circuit 16 and the first monitoring section 8a (the second monitoring section 8b, the third monitoring section 8c, . . . ) performs monitoring (performance monitoring) for quality control of a transmission path and/or a signal to be transmitted in a manner to adhere to bit rate information of the input signal. The first monitoring section 8a (the second monitoring section 8b, the third monitoring section 8c, . . . ) extracts alarm information "b7" from the data signal "b4" fed from the clock/data regenerating circuit 16 and transfers it to the selection connecting section 7. The selection connecting section 7, when the switching control section 11 receives the alarm information "b7", transfers the alarm information "b7" to devices mounted on the downstream side.

According to the second embodiment, the same effects as obtained by the above first embodiment can be achieved. In addition, since the clock/data regenerating circuit outputs frequency information of a clock signal and, therefore, circuit configurations can be simplified, and costs can be reduced.

It is apparent that the present invention is not limited to the above embodiments but may be changed and modified without departing from the scope and spirit of the invention. For example, the optical signal receivers described in the above embodiments may be configured so that, if a corresponding monitoring section is not prepared in the performance monitoring circuit, the selection connecting section sends out alarm information, for example, showing that performance monitoring is not being done. By configuring above, even if the corresponding monitoring section is not prepared, no false alarm is output in any case. Moreover, as the clock/data regenerating circuit, a circuit that operates by a reference clock may be used.

Also, the monitoring section of the performance monitoring circuit may be configured so as to be able to be expanded, replaced, and removed.

Also, in addition to the monitoring sections corresponding to specifications for the SONET/SDH network including the type number 1 (transmission method type: OC-3, STM-1 (bit rate: 155.52 [Mbps]), type number 2 (transmission method type: OC-12, STM-4 (bit rate: 622.08 [Mbps]), type number 6 (transmission method type: OC-48, STM-16 (bit rate: 2488.32 [Mbps]), monitoring sections corresponding to the specifications including a transmission method type: OC-1, STM-0 (bit rate: 51.84 [Mbps]), transmission method type: OC-192, STM-64 (bit rate: 10 [Gbps]), and transmission method type: OC-768, STM-256 (bit rate: 40 [Gbps]) may be installed.

Also, the optical signal receiver may be so configured that the frequency detecting circuit and/or bit-rate information converting circuit are included in the performance monitoring circuit.

Also, the transmission of optical signals may be terminated by the optical signal receiver or optical signals may be transferred further.

Furthermore, the present invention may be applied to cases where the performance monitoring circuit can be used to extract alarm information and to install a function of measuring and/or evaluating optical signals.

What is claimed is:

1. An optical signal receiver, comprising:
   a photoelectric converting unit to receive an optical signal containing alarm information and to convert the received optical signal into an electrical signal;
   a regenerating unit to regenerate a clock signal and data based on the electrical signal obtained by the photoelectric conversion in said photoelectric converting unit and to obtain a regenerated signal comprising the regenerated clock signal and the regenerated data;
   a transmission speed information acquiring unit to acquire information about a transmission speed of the regenerated signal;
   a plurality of alarm information extracting units provided in a manner to correspond to each of a plurality of types of transmission methods each providing, at least, a different transmission speed for every different type of transmission method, which extracts alarm information contained in the regenerated signal; and
   a selection connecting unit to select a corresponding alarm information extracting unit out of said plurality of alarm information extracting units based on the transmission speed information and to connect the selected alarm information extracting unit to said regenerating unit.

2. The optical signal receiver according to claim 1, wherein said selection connecting unit has a storing unit to store the transmission speed information associated with said alarm information extracting unit on an other end of connection.

3. The optical signal receiver according to claim 1, wherein said transmission speed information acquiring unit has a frequency detecting unit to detect a frequency of the regenerated signal.

4. The optical signal receiver according to claim 1, wherein said regenerating unit transmits information about a frequency of a clock signal to said transmission speed information acquiring unit and said transmission speed information acquiring unit has a transmission speed information converting unit to convert said information about the frequency of the clock signal into the transmission speed information.

5. The optical signal receiver according to claim 1, wherein said selection connecting unit outputs a warning representing non-monitoring when said alarm information extracting unit on an other end of connection which corresponds to the transmission speed information of the regenerated signal is not provided.

6. The optical signal receiver according to claim 1, wherein said selection connecting unit receives the alarm information extracted by said alarm information extracting unit and sends out the received alarm information towards a downstream side.

7. The optical signal receiver according to claim 1, wherein said transmission speed information acquiring unit includes a frequency detecting unit to detect a frequency of the regenerated clock signal to identify a bit rate of transmissions, the regenerated clock signal being synchronized with the bit rate of transmission, and
   wherein the selection connecting unit selects the corresponding alarm information extracting unit based on the transmission speed information to select the alarm information extraction unit corresponding to the identified bit rate of the transmission signal.

8. An optical signal monitoring unit provided in an optical signal receiver comprising a photoelectric converting unit to receive an optical signal containing alarm information and to convert the received optical signal into an electrical signal, a regenerating unit to regenerate a clock signal and data based on the electrical signal obtained by the photoelectric conversion in said photoelectric converting unit and to obtain a regenerated signal comprising the regenerated clock signal and the regenerated data, said optical signal monitoring unit comprising:
   a plurality of alarm information extracting units provided in a manner to correspond to each of a plurality of types of transmission methods each providing, at least, a different transmission speed for every different type of transmission method, which extracts alarm information contained in the regenerated signal; and
   a selection connecting unit to select a corresponding alarm information extracting unit out of said plurality of alarm information extracting units based on transmission speed information fed from a transmission speed information acquiring unit that obtains the transmission speed information about the regenerated signal and to connect the selected alarm information extracting unit to said regenerating unit.

9. The optical signal monitoring unit according to claim 8, wherein said selection connecting unit has a storing unit to store the transmission speed information associated with said alarm information extracting unit on an other end of a connection.

10. The optical signal monitoring unit according to claim 8, wherein said transmission speed information acquiring unit has a frequency detecting unit to detect a frequency of the regenerated signal.

11. The optical signal monitoring unit according to claim 8, wherein said regenerating unit transmits information about a frequency of a clock signal to said transmission speed information acquiring unit and said transmission speed information acquiring unit has a transmission speed information converting unit to convert said information about the frequency of the clock signal into the transmission speed information.

12. The optical signal monitoring unit according to claim 8, wherein said selection connecting unit outputs a warning representing non-monitoring when said alarm information extracting unit on an other end of connection which corresponds to the transmission speed information of the regenerated signal is not provided.

13. The optical signal monitoring unit according to claim 8, wherein said selection connecting unit receives the alarm information extracted by said alarm information extracting unit and sends out the received alarm information towards a downstream side.

14. A method for monitoring an optical signal, said method comprising:
    making a photoelectric converting unit receive an optical signal containing alarm information and convert the received optical signal into an electrical signal;
    making a regenerating unit regenerate a clock signal and data based on the electrical signal obtained by the photoelectric conversion in said photoelectric converting unit and obtain a regenerated signal comprising the regenerated clock signal and the regenerated data;
    making a transmission speed information acquiring unit obtain information about a transmission speed of the regenerated signal;
    making a specified alarm information extracting unit extract alarm information contained in the regenerated signal, wherein said specified alarm information extracting unit is selected out of a plurality of alarm information extracting units provided in a manner to correspond to each of a plurality of types of transmission methods each providing, at least, a different transmission speed for every different type of transmission method; and
    making a selection connecting unit select a corresponding alarm information extracting unit out of said plurality of alarm information extracting units based on the transmission speed information, and connect the selected alarm information extracting unit to said regenerating unit.

15. The method for monitoring an optical signal according to claim 14, wherein said selection connecting unit has a storing unit to store the transmission speed information associated with said alarm information extracting unit on an other end of a connection.

16. The method for monitoring an optical signal according to claim 14, wherein said transmission speed information acquiring unit detects a frequency of the regenerated signal by using a frequency detecting unit.

17. The method for monitoring an optical signal according to claim 14, wherein said regenerating unit transmits said information about a clock signal to said transmission speed information acquiring unit and said transmission speed information acquiring unit converts said information about a frequency into the transmission speed information by using a transmission speed information converting unit.

18. The method for monitoring an optical signal according to claim 14, wherein said selection connecting unit outputs a warning representing non-monitoring when said alarm information extracting unit on an other end of connection which corresponds to the transmission speed information of the regenerated signal is not provided.

19. The method for monitoring an optical signal according to claim 14, wherein said selection connecting unit receives the alarm information extracted by said alarm information extracting unit and sends out the received alarm information towards a downstream side.

20. An optical signal receiver, comprising:
    a photoelectric converting unit to receive an optical signal containing alarm information and to convert the received optical signal into an electrical signal;
    a regenerating unit to regenerate a clock signal and data based on the electrical signal obtained by the photoelectric conversion in said photoelectric converting unit and to obtain a regenerated signal comprising the regenerated clock signal and the regenerated data;
    a transmission speed information acquiring unit to acquire information about a transmission speed of the regenerated signal;
    a plurality of alarm information extracting units provided in a manner to correspond to each of a plurality of types of transmission methods each providing, at least, a different transmission speed for every different type of transmission method, which extracts alarm information contained in the regenerated signal; and
    a selection connecting unit to select a corresponding alarm information extracting unit out of said plurality of alarm information extracting units based on the transmission speed information and to connect the selected alarm information extracting unit to said regenerating unit,
    wherein said selection connecting unit has a storing unit to store the transmission speed information associated with said alarm information extracting unit on an other end of connection,
    wherein said transmission speed information acquiring unit has a frequency detecting unit to detect a frequency of the regenerated signal,
    wherein said regenerating unit transmits information about a frequency of a clock signal to said transmission speed information acquiring unit and said transmission speed information acquiring unit has a transmission speed information converting unit to convert said information about the frequency of the clock signal into the transmission speed information, and
    wherein said selection connecting unit receives the alarm information extracted by said alarm information extracting unit and sends out the received alarm information towards a downstream side, whereas said selection connecting unit outputs a warning representing non-monitoring when said alarm information extracting unit on an other end of connection which corresponds to the transmission speed information of the regenerated signal is not provided.

* * * * *